US007149816B1

(12) United States Patent
Port et al.

(10) Patent No.: US 7,149,816 B1
(45) Date of Patent: Dec. 12, 2006

(54) SYSTEM AND METHOD FOR PEER-LEVEL COMMUNICATION WITH A NETWORK INTERFACE CARD

(75) Inventors: Adrian G. Port, Downingtown, PA (US); Charles D. Spackman, Chester Springs, PA (US); Timothy P. Sullivan, Plano, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/571,140

(22) Filed: May 16, 2000

(51) Int. Cl.
*G06F 15/16* (2006.01)
(52) U.S. Cl. .................... 709/250; 709/219; 370/463; 370/353; 370/359
(58) Field of Classification Search .............. 709/219, 709/250, 251, 252, 253; 370/463, 353, 359, 370/419
See application file for complete search history.

(56) References Cited

U.S. PATENT DOCUMENTS

| | | | |
|---|---|---|---|
| 5,657,390 A | 8/1997 | Elgamal et al. | |
| 5,674,003 A | 10/1997 | Anderson et al. | |
| 5,937,169 A * | 8/1999 | Connery et al. | 709/250 |
| 5,940,387 A * | 8/1999 | Humpleman | 370/352 |
| 6,085,247 A * | 7/2000 | Parsons, Jr. et al. | 709/227 |
| 6,101,543 A * | 8/2000 | Alden et al. | 709/229 |
| 6,253,334 B1 * | 6/2001 | Amdahl et al. | 714/4 |
| 6,308,238 B1 * | 10/2001 | Smith et al. | 710/129 |
| 6,388,782 B1 * | 5/2002 | Stephens et al. | 359/124 |
| 6,427,173 B1 * | 7/2002 | Boucher et al. | 709/238 |
| 6,438,613 B1 * | 8/2002 | Yeung et al. | 709/250 |
| 6,499,065 B1 * | 12/2002 | Hyder et al. | 709/321 |
| 6,516,352 B1 * | 2/2003 | Booth et al. | 709/250 |
| 6,697,868 B1 * | 2/2004 | Craft et al. | 709/230 |

FOREIGN PATENT DOCUMENTS

EP 0 381 365 8/1990

OTHER PUBLICATIONS

Jim Frost; "BSD Sockets: A Quick And Dirty Primer"; Software Tool & Die; Apr. 11, 1994; p. 1-5.
Bob Quinn; "WinSock 2 Information"; www.sockets.com; Dec. 5, 1998; p. 1-6.
Raymond E. Dessy; "Computer Connections"; Laboratory Automation & Infomration Management, Elsevier Science Publishers BV., Amsterdam, NL, vol. 32, No. 2-3; Nov. 1, 1996; p. 53-62.
Matsuaki Terada, Tatsuya Yokoyama, Tetsuhiko Hirata and Susumu Matsui; "A High Speed Protocol Processor to Execute OSI"; Networking in the Nineties. Bal Harbour; Apr. 7-11, 1991; Proceedings of the Annual Joint Conference of the Computer and Communications Societies. (INFOCOM), New York, IEEE, US, vol. 2 Conf. 10; Apr. 7, 1991, p. 944-949.

(Continued)

Primary Examiner—Jeffrey Pwu

(57) ABSTRACT

For use in a computer system having a bus coupled to first and second devices and network interface circuitry, a system for, and method of, allowing one of the first and second devices to communicate with a computer network via the network interface circuitry and a computer system incorporating the system or the method. In one embodiment, the system includes: (1) transport stack circuitry, coupled between the bus and the network interface circuitry, that provides socket-layer access to the network interface circuitry via the bus and (2) channel control circuitry, associated with the transport stack circuitry, that establishes unique channels for allowing peer-to-peer, socket-layer access between the first and second devices and the transport interface circuitry within the computer system.

19 Claims, 6 Drawing Sheets

OTHER PUBLICATIONS

Lee Goldberg; "100Base-T4 Transceiver Simplifies Adapter, Repeater, and Switch Designs"; Electronic Design; Penton Publishing, Clevelend OH, US, vol. 43, No. 6; Mar. 20, 1995; p. 155-156, 158, 160.

Lee Goldberg; "Speed Does Matter: Gigabit Switch Chip Raises the Bar"; Electronic Design, Penton Publishing, Clevelend OH, US, vol. 46, No. 17; Jul. 20, 1998; p. 53-54, 56, 58.

* cited by examiner

SYSTEM AND METHOD FOR PEER-LEVEL COMMUNICATION WITH A NETWORK INTERFACE CARD

TECHNICAL FIELD OF THE INVENTION

The present invention is directed, in general, to computer systems and, more specifically, to a system and method for peer-level communication with a network interface card in a computer system.

BACKGROUND OF THE INVENTION

In the early days of computing, computer systems were standalone processors to which peripheral devices such as displays and printers and input devices were connected. Each computer system was independent and communicated little with other computer systems. Today, however, it is well known that interconnecting computer systems in computer networks, such as local area networks or wide area networks, greatly enhances the sharing of data, services and resources available from the various computer systems that are part of the network.

To communicate between the different computer systems along a network, many communication protocols have been developed. Some examples of well-known network protocols include the System Network Architecture (SNA), Transmission Control Protocol/Internet Protocol (TCP/IP), Network Basic Input Output System (NetBIOS), and Internet Packet Exchange/Sequence Packet Exchange (IPX/SPX). Those skilled in the art are familiar with each of these protocols, as well as others.

Conventional network interface cards (NICs) sold today consist of a host interface, media access layer logic and a physical interface. The goal in NIC design is to transport network packets to and from a resident host as expeditiously as possible, which usually means minimizing the hardware through which the packet stream is forced to travel. Host resident software, consisting of a network driver, a transport stack (which may be TCP/IP) and a socket layer interface, processes the packet stream or streams into buffer layer transfers that are presented to applications through a relatively uniform application program interface ("API"). In a Unix/Linux environment, the API is usually referred to as a "socket." In a Windows® NT/2000 environment, the API is embodied as "Winsock 2." Other interface layers, such as the TDI interface layer for kernel access within Windows NT, are possible. It should be noted, however, that all of these interface points occur at the top of the transport stack.

Currently, devices within a computer system wishing to communicate with the network do so at the socket layer. For example, if a Redundant Array of Independent Disks (RAID) controller is present within the system, network file system requests result in activity within the host to service those requests. Disk I/O blocks that are read from the RAID controller are first transferred to the computer system's main memory, and, from there, through an API to the transport stack. In the transport stack, the blocks are encapsulated within the selected protocol and transferred to the NIC for transmission as one or more IP packets.

As mentioned above, it is important to note that all of these interface points occur at the top of the transport stack. Therefore, it should be apparent from the above discussion that all data travels twice across the system's I/O bus, and that this wasteful data movement therefore becomes a major bottleneck for network throughput.

To accelerate data transfer rates, prior art solutions called for the transport stack to be moved to the level of a mezzanine bus within the computer system. This required the use of co-processors located on the NIC itself (commonly known as "intelligent processors") to run the TCP/IP stack. Unfortunately, intelligent processors proved expensive and sometimes actually decreased network throughput.

Accordingly, what is needed in the art is a way to increase network throughput reliably, without substantially increasing the cost of the computer system as a whole.

SUMMARY OF THE INVENTION

To address the above-discussed deficiencies of the prior art, the present invention provides, for use in a computer system having a bus coupled to first and second devices and network interface circuitry, a system for, and method of, allowing one of the first and second devices to communicate with a computer network via the network interface circuitry and a computer system incorporating the system or the method. In one embodiment, the system includes: (1) transport stack circuitry, coupled between the bus and the network interface circuitry, that provides socket-layer access to the network interface circuitry via the bus and (2) channel control circuitry, associated with the transport stack circuitry, that establishes unique channels for allowing peer-to-peer, socket-layer access between the first and second devices and the transport interface circuitry within the computer system.

The present invention therefore introduces the broad concept of providing channeled access to socket-layer network interface hardware to allow plural devices in a computer system to communicate with a computer network via the interface hardware. This enables peer-to-peer communication to take place within the computer system, freeing otherwise intervening devices (such as hosts and further bus bandwidth) for other tasks.

In one embodiment of the present invention, the network interface circuitry is located on a NIC removably coupled within the computer system and is selected from the group consisting of: (1) 10Base-T network interface circuitry, (2) 10/100Base-T network interface circuitry, (3) 100Base-T network interface circuitry, (4) OC-12 optical network interface circuitry, (5) OC-48 optical network interface circuitry, (6) OC-192 optical network interface circuitry, (7) Gigabit Ethernet® optical network interface circuitry and (8) Token Ring® network interface circuitry. Those skilled in the pertinent art will perceive, however, that the present invention is advantageously operable with any conventional or later-developed link or physical interface technology.

In one embodiment of the present invention, the transport stack circuitry is located on a NIC removably coupled within the computer system. In a related embodiment of the present invention, the channel control circuitry is located on a NIC removably coupled within the computer system. In an embodiment to be illustrated and described, the transport stack circuitry and the channel control circuitry are both located on the NIC.

In one embodiment of the present invention, the transport stack circuitry comprises a TCP/IP stack. Any protocol stack that can exist between the socket layer and the physical layer (network interface circuitry) is, however, within the broad scope of the present invention.

In one embodiment of the present invention, the first device is a host device for the bus. The host device may be, for example, a processor of the computer system.

In one embodiment of the present invention, the second device is a disk controller of the computer system. Thus, a disk or disk array may communicate directly to a computer network via the network interface circuitry without having to engage the processor or memory of the computer system. Of course, all devices that may form part of a conventional or later-developed computer system are within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
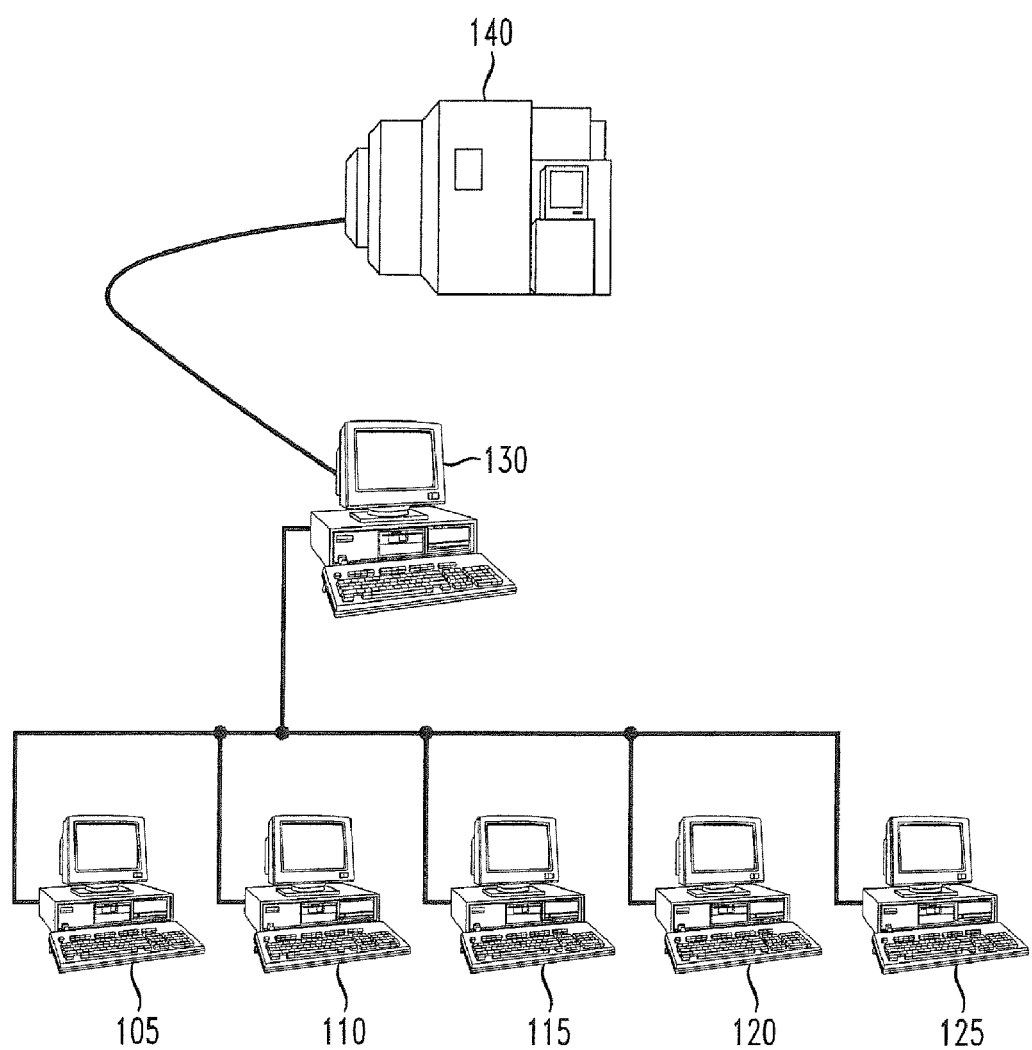
FIG. 1 illustrates a computer network that can operate in conjunction with the system or method of the present invention.

Referring initially to FIG. 1, illustrated is a computer network 100 that can incorporate the system or method of the present invention. The network 100 illustrated in FIG. 1 is a local area network ("LAN"), but the present invention is in no way limited to LANs. As the name "LAN" implies, computers in the network are networked locally (i.e., within a room or building) so that various types of data may be interchanged among individual computers.

Present in the network 100 are computers 105, 110, 115, 120, 125. The computers 105, 110, 115, 120, 125 provide interfaces to users, as well as possibly providing purely local applications to individual users. The network 100 is illustrated as a 10Base-T network, but the present invention is in no way limited to a particular media access control/physical layer topology.

Connected to the computers 105, 110, 115, 120, 125 is a server 130. The server 130 manages the flow of traffic within the network 100. The server 130 also manages all the data in a central storage system 140 for use by the users of the computers 105, 110, 115, 120, 125. The central storage system 140 may be a RAID, controlled by a RAID controller.

Figure 2:
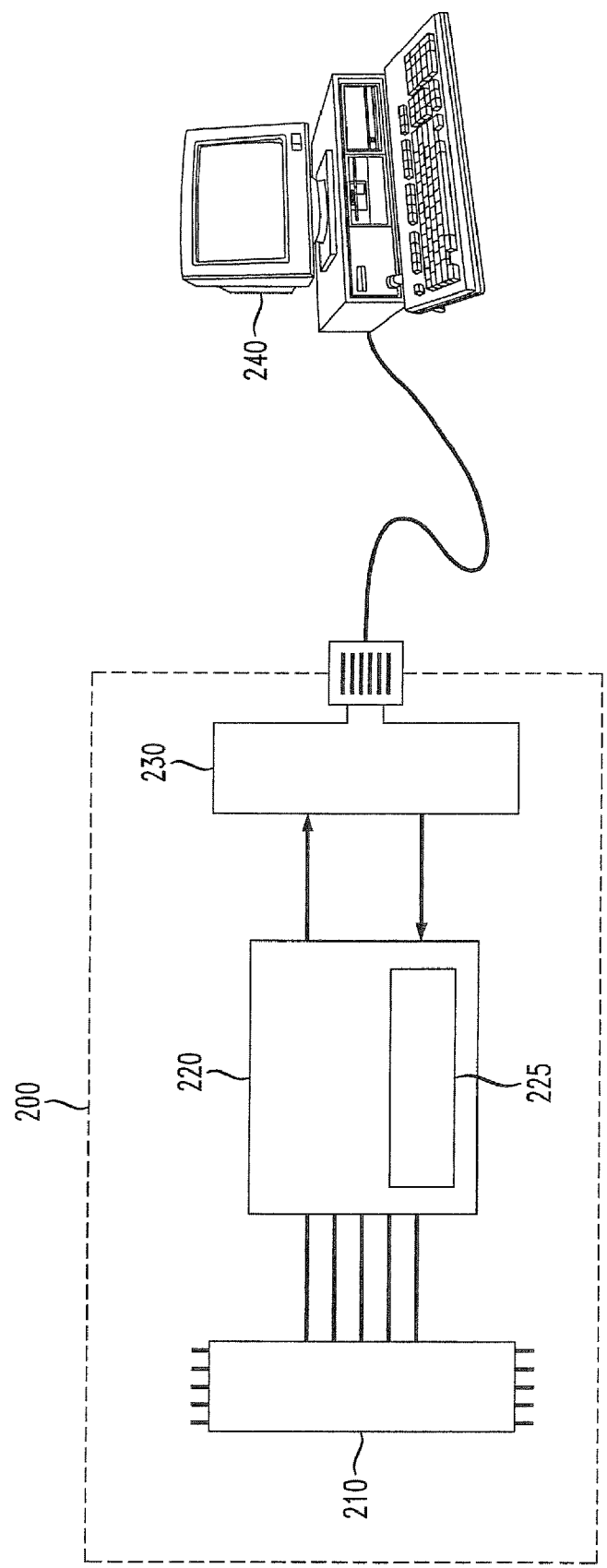
FIG. 2 illustrates a NIC employable with the computer network of FIG. 1 and that can incorporate the system or method of the present invention.

Turning now to FIG. 2, illustrated is a NIC 200 employable with the computer network 100 of FIG. 1 and that can incorporate the system or method of the present invention. The NIC 200 is connected to one of the computers 105, 110, 115, 120, 125 to connect the computers 105, 110, 115, 120, 125 to the network 100 of FIG. 1. The NIC 200 contains a bus interface 210 that connects directly to a computer (perhaps a computer 240, by way of example). The NIC 200 also contains an input/output chip 220 that encodes and decodes data to be passed between one of the computers 105, 110, 115, 120, 125 and the network.

The input/output chip 220 is associated with a buffer 225. The buffer 225 has memory that is given the task of temporarily holding information for the purpose of waiting for the destination device to be able to receive data. Therefore, if the server 130 is delayed a few milliseconds before it can accept data, the buffer 225 holds the data until the server 130 can accept it.

Finally, the NIC 200 contains a network interface 230. The network interface 230 is the location at which the NIC can directly connect to the network 100 of FIG. 1.

Figure 3:
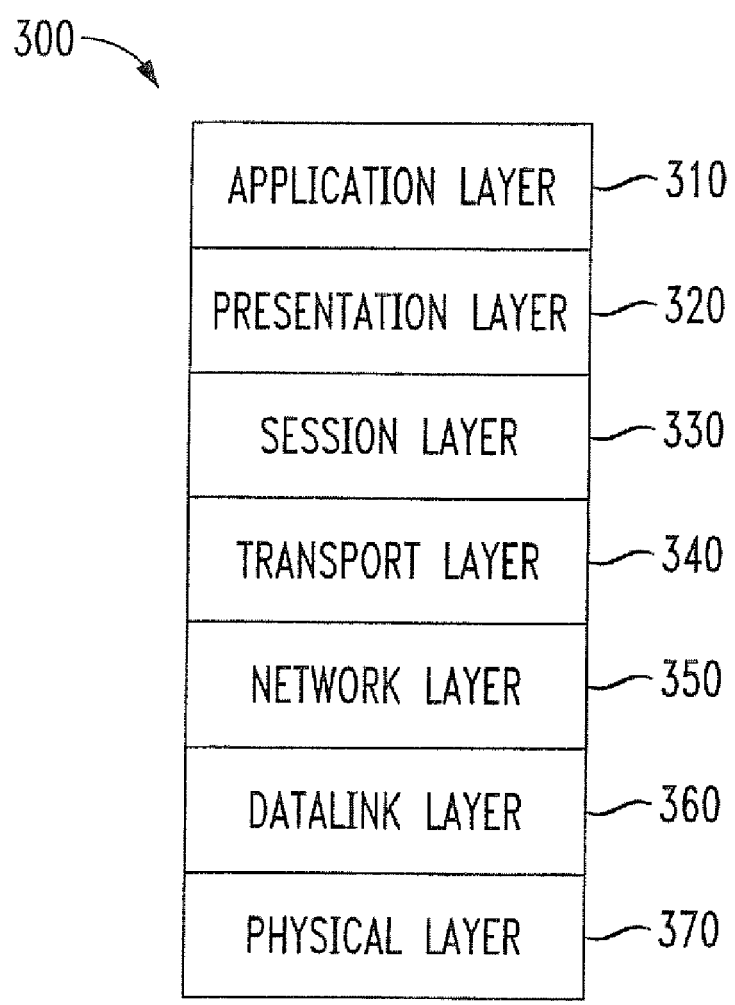
FIG. 3 illustrates an exemplary seven-layer Open Systems Interconnect (OSI) model that can be employed to describe a network communication interface constructed according to the principles of the present invention.

Turning now to FIG. 3, illustrated is an exemplary seven-layer Open Systems Interconnect (OSI) model that can be employed to describe a network communication interface constructed according to the principles of the present invention. The skilled in the art are familiar with the OSI model as a description of the interface between a host system and the network. The OSI model is one of the most well-known theoretical descriptions of network communications, although many communication implementations combine or omit one or more of the OSI layers. A physical layer 370 is the lowest layer, and interacts directly with the network. The physical layer 370 includes the actual bit stream transmission across the physical connections to the network.

The second layer is a datalink layer 360, which provides multiplexing and framing of the physical layer stream into messages. The datalink layer 360 also provides error detection, synchronization information and physical channel management.

The third layer is a network layer 350 that controls routing of information through the network. Services such as addressing, network initialization, switching, segmenting and formatting are provided in the network layer 350. Acknowledgment of data delivery is accomplished either in the network layer 350 or in the datalink layer 360.

The fourth layer is a transport layer 340, which controls transparent data delivery, multiplexing and mapping. Reliable delivery (as opposed to best efforts in the underlying physical, datalink and network layers 370, 360, 350) is accomplished by the transport layer 340 if desired in a particular application. Services such as retransmission of missing data, reordering of data delivered out of order and correction of transmission errors are usually accomplished in the transport layer 340.

The fifth layer is a session layer 330. The session layer 330 uses the information from the transport layer 340 to group pieces of data together as a common activity between two nodes in the network, commonly called a session.

The sixth layer is a presentation layer 320, which includes the interface between the session layer 330 and the topmost seventh layer, which is an application layer 310. The presentation layer 320 presents information for use in the application layer 310 without compromising the integrity of the session layer 330. The presentation layer 320 provides data interpretation and format and code transformation, while the application layer 310 provides user application interfaces and management functions.

Figure 4:
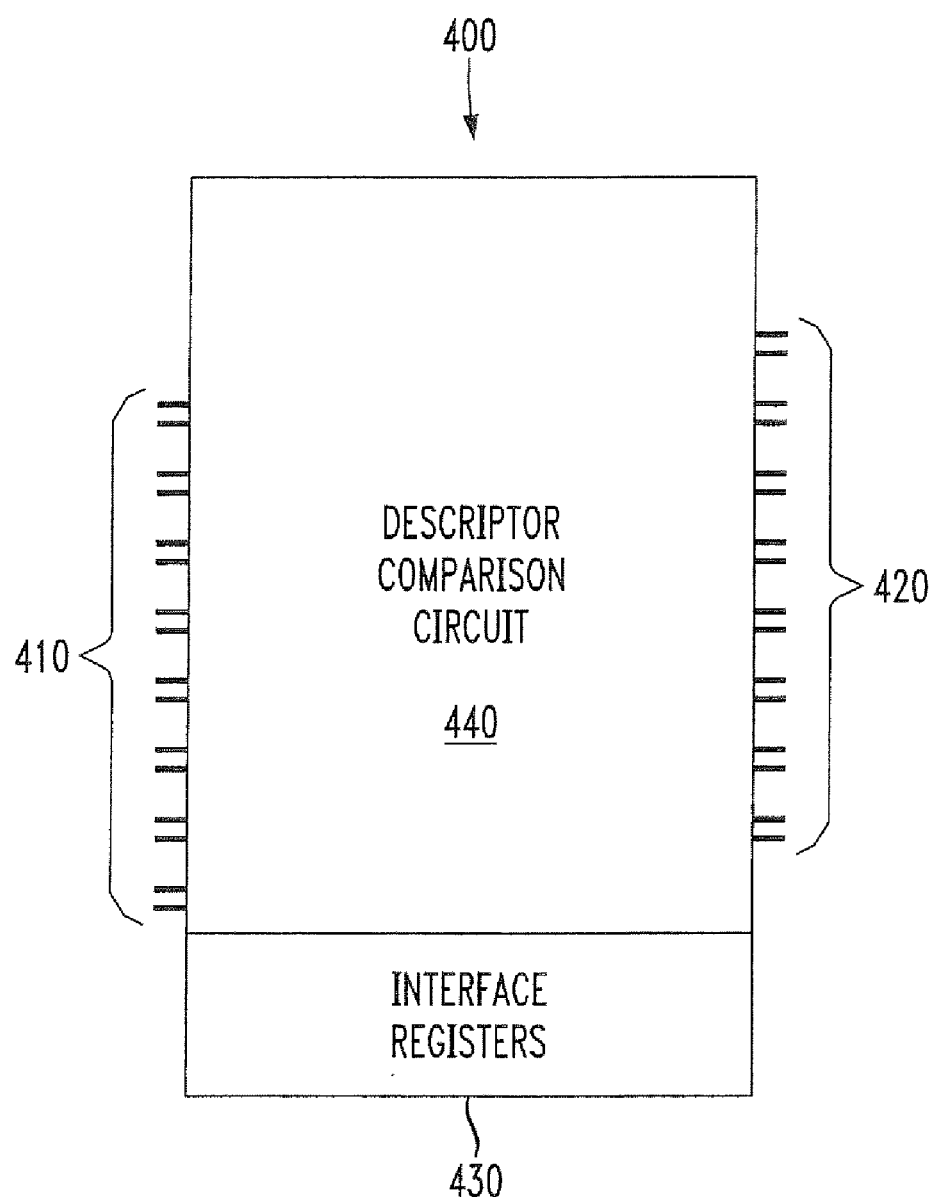
FIG. 4 illustrates a channel switching mechanism constructed according to one embodiment of the present invention.

Turning now to FIG. 4, illustrated is a channel switching mechanism, generally designated 400, constructed according to one embodiment of the present invention. Though not shown in FIG. 2, the channel switching mechanism 400 is advantageously located in the NIC 200.

The channel switching mechanism 400 directs data to its appropriate destination, so that devices external to the server can communicate on a peer-to-peer basis, rather than employing server bandwidth. The channel switching mechanism 400 is preferably hardware-based and can direct multiple channels of traffic concurrently.

The channel switching mechanism 400 is illustrated as containing eight inputs 410 and eight outputs 420. Each output corresponds to a channel, an interface with either the host or peer device. The network interface therefore can support multiple concurrent channels. Although the channel switching mechanism 400 is capable of handling only eight channels, the present invention is in no way limited to a particular number, or even a fixed number, of channels.

The data to be handled by the channel switching mechanism 400 has input/output descriptors associated therewith that provide information to the channel switching mechanism 400 as to which device originated the data, and what the destination of the data is to be. The channel switching mechanism 400 reads and sends input/output descriptors to a descriptor comparison circuit 440.

Also shown in FIG. 4 is a dedicated set of interface registers 430. The set of interface registers 430 contains information allowing the channel switching mechanism 400 to associate the input/output descriptor of the incoming data to the appropriate channel output, so it can be directed to the appropriate destination. The descriptor comparison circuit 440 compares the input/output descriptor with the values present in the dedicated set of interface registers 430. The descriptor comparison circuit 440 then communicates a value to a controller in the channel switching mechanism 400. The processor in the channel switching mechanism 400 uses the value to send the data to its intended destination. The net effect of this processing is that peer devices and the host system each may communicate with the NIC without direct knowledge of the originating device; all of the pertinent information is located on the NIC itself.

Therefore, according to this embodiment of the present invention, the data first enters the channel switching mechanism 400 at a point 410. Along with (preferably leading) the data is its input/output descriptor. The channel switching mechanism 400 sends the input/output descriptor to the descriptor comparison circuit 440. When the descriptor comparison circuit 440 finds the value in the dedicated set of interface registers 430 that corresponds to the given input/output descriptor, the channel switching mechanism 400 then directs the data to the appropriate output at a point 420. The point 420 corresponds to the second device, which is to be the destination of the data.

Figure 5:
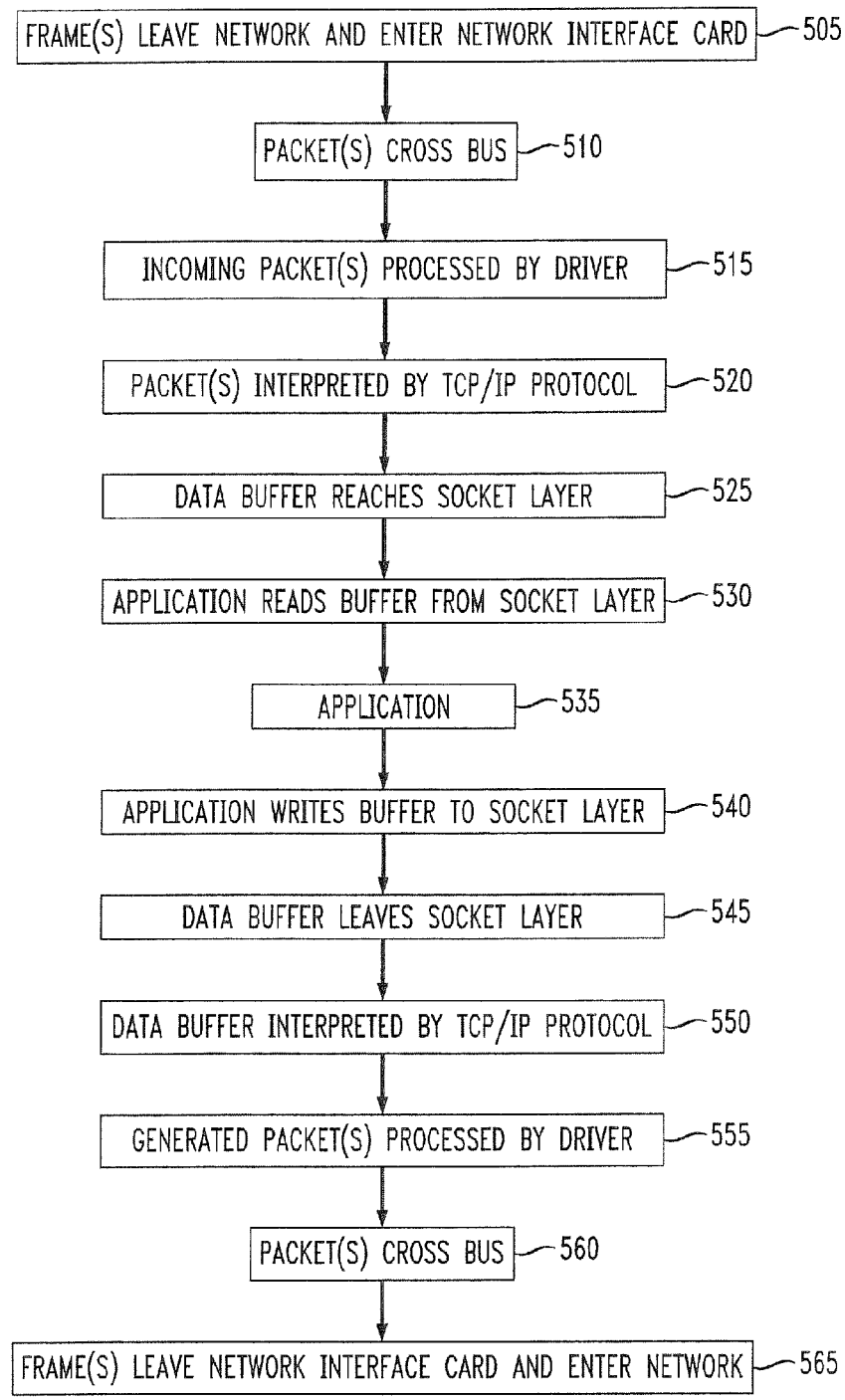
FIG. 5 illustrates a flow diagram indicating the flow of data through a network in the vicinity of a server according to the prior art.

Turning now to FIG. 5, illustrated is a flow diagram, generally designated 500, that indicates the flow of data through a network in the vicinity of a server according to the prior art. In this diagram, the flow of the data is from a first device to a second device, both of which are connected to a server. The first and second devices may be computers, printers, individual disk drives, RAID controllers or any other devices that can be connected together by way of a network and server.

In a step 505, the data, encapsulated in one or more frames, leaves the network and enters the server's NIC. Then, (in a step 510) the data, stripped of frame headers in the NIC and now in packet form, crosses the server's bus to the server's processor. The data packets are processed by a NIC software driver (in a step 515) and interpreted according to a TCP/IP protocol (in a step 520) embodied in software. The data is extracted from its packets and, at this point, reaches the socket layer (in a step 525) and is placed in a buffer. The application for which the data is destined now reads the data from the buffer via the socket layer (in a step 530) and processes it accordingly (in a step 535).

Assuming that the application now wishes to return data to the network, it now is required to write the data to a buffer via the socket layer (in a step 540). The data then leaves the socket layer (in a step 545) and is interpreted according to TCP/IP (in a step 550) to yield packets. The packets are processed by the NIC driver as outbound data (in a step 555), cross the server's bus to the NIC (in a step 560) and framed and transferred to the network in the NIC (in a step 565). It is apparent to see that this is a lengthy and potentially resource-hungry process.

Figure 6:
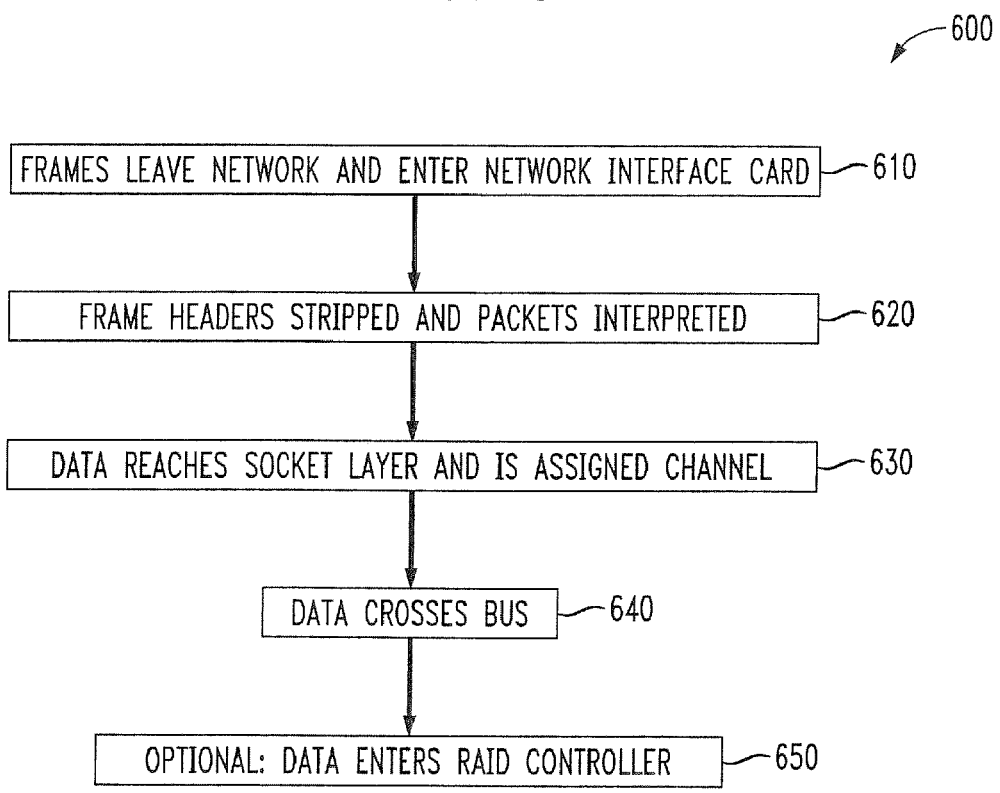
FIG. 6 illustrates a flow diagram indicating the flow of data through a network in the vicinity of a server according to one embodiment of the present invention.

Turning now to FIG. 6, illustrated is a flow diagram, generally designated 600, that indicates the flow of data through a network in the vicinity of a server according to one embodiment of the present invention. The flow of data described with respect to FIG. 5, above, sharply contrasts with that described with respect to FIG. 6. Data frames enter the NIC of the server in an initial step 610.

In a step 620, the data frames are stripped of their frame headers, interpreted according to TCP/IP and enter the socket layer as payload and still within the NIC. Then, in a step 630, channel circuitry inside the NIC directs the data to an appropriate channel and ultimately to the second device. Only at this point does the data cross the bus (in step 640). If, for example, the second device is associated with a RAID controller, the (disk I/O) data enters the RAID controller via the socket layer (in an optional step 650). At no time does the data need to enter the server hardware. According to the principles of the present invention, the path that data is required to travel is shorter and requires significantly fewer server resources than the path the prior art provides. In fact, in the illustrated embodiment, the server hardware itself is not required to perform any operations relative to the transmission of data through the NIC. This allows the server to turn its attention to the performance of other tasks, such as providing services to users connected to the network.

While the above has been described with respect to TCP/IP, those skilled in the pertinent art will understand that the present invention is not limited to a particular protocol.

The design of server hardware can also benefit from the principles of the present invention. Since the server hardware is not called upon to perform network data transmission, the server hardware can be optimized for other jobs the server may be called upon to perform.

Although the present invention has been described in detail, those skilled in the art should understand that they can make various changes, substitutions and alterations herein without departing from the spirit and scope of the invention in its broadest form.

What is claimed is:

1. For use in a computer system having a network interface circuitry and a bus coupled between a first device and a second device, a system for allowing communications in a computer network via said network interface circuitry, comprising:

a transport stack circuitry, coupled between said bus and said network interface circuitry, which provides socket-layer access to said network interface circuitry via said bus; and a channel control circuitry, coupled with said transport stack circuitry, to establish unique interfaces for allowing peer-to-peer, socket-layer access between said devices, wherein said first device is a host device for said bus and said second device is a controller of said computer system.

2. The system as recited in claim 1 wherein said network interface circuitry is located on a network interface card removably coupled within said computer system and is selected from the group consisting of:
10Base-T network interface circuitry,
10/100Base-T network interface circuitry,
100Base-T network interface circuitry,
OC-12 optical network interface circuitry,
OC-48 optical network interface circuitry,
OC-192 optical network interface circuitry,
Gigabit Ethernet® optical network interface circuitry, and
Token Ring® network interface circuitry.

3. The system as recited in claim 1 wherein at least one of said transport stack circuitry and said channel control circuitry is located on a network interface card removably coupled within said computer system.

4. The system as recited in claim 1 wherein said unique interfaces are logical channels.

5. The system as recited in claim 1 wherein said transport stack circuitry comprises TCP/IP stack.

6. The system as recited in claim 1 wherein said second device is a disk controller of said computer system.

7. For use in a computer system having network interface circuitry and a bus couple between a first device and a second device, a method of allowing communications in a computer network via said network interface circuitry, comprising:
providing socket-layer access to said network interface circuitry via said bus employing transport stack circuitry coupled between said bus and said network interface circuitry; and
establishing unique interfaces employing a channel switching mechanism to allow peer-to-peer, socket-layer access between said devices.

8. The method as recited in claim 7 wherein said network interface circuitry is located on a network interface card removably coupled within said computer system and is selected from the group consisting of:
10Base-T network interface circuitry,
10/100Base-T network interface circuitry,
100Base-T network interface circuitry,
OC-12 optical network interface circuitry,
OC-48 optical network interface circuitry,
OC-192 optical network interface circuitry,
Gigabit Ethernet® optical network interface circuitry, and
Token Ring® network interface circuitry.

9. The method as recited in claim 7 wherein at least one of said providing and said establishing is carried out on a network interface card removably coupled within said computer system.

10. The method as recited in claim 7 wherein said unique interfaces are logical channels.

11. The method as recited in claim 7 wherein said first device is a host device for said bus.

12. The method as recited in claim 7 wherein said second device is a disk controller of said computer system.

13. A computer system allowing communication in a computer network via network interface circuitry, comprising:
a bus;
first and second devices, said bus coupled therebetween;
network interface circuitry coupled to said bus; and
a transport stack circuitry, coupled between said bus and said network interface circuitry, which provides socket-layer access to said network interface circuitry via said bus, and
a channel control circuitry, coupled with said transport stack circuitry, to establish unique interfaces for allowing peer-to-peer, socket-layer access between said devices, wherein said first device is a host device for said bus and said second device is a controller of said computer system.

14. The computer system as recited in claim 13 wherein said network interface circuitry is located on a network interface card removably coupled within said computer system and is selected from the group consisting of:
10Base-T network interface circuitry,
10/100Base-T network interface circuitry,
100Base-T network interface circuitry,
OC-12 optical network interface circuitry,
OC-48 optical network interface circuitry,
OC-192 optical network interface circuitry,
Gigabit Ethernet® optical network interface circuitry, and
Token Ring® network interface circuitry.

15. The computer system as recited in claim 13 wherein at least one of said transport stack circuitry and said channel control circuitry is located on a network interface card removably coupled within said computer system.

16. The computer system as recited in claim 13 wherein said unique interfaces are logical channels.

17. The computer system as recited in claim 13 wherein said transport stack circuitry comprises a TCP/IP stack.

18. The computer system as recited in claim 13 wherein said second device is a disk controller of said computer system.

19. A network interface card, for use in a server having a bus coupled to a first device and a second device, said network interface card allowing one of said first and second devices to communicate with a computer network via network interface circuitry on said network interface card, comprising:
transport stack circuitry, coupled between said bus and said network interface circuitry, configured to provide socket-layer access to said network interface circuitry for said server via said bus; and
a channel switching mechanism, associated with said transport stack circuitry, configured to establish unique interfaces to allow peer-to-peer payload transfer via socket-layer access between said first device and said second device without traversing up and down a transport stack, including:
an interface register containing information associating said payload from said first and second device to one of said unique interfaces; and
a descriptor comparison circuit configured to compare said payload to said information to establish said unique interfaces.

* * * * *